S. H. Hartman,
Slide Valves for Steam Engines,

N° 36,299.   Patented Aug. 26, 1862.

Witnesses  
Harry W. Price.  
A. Pohlers

Inventor  
Samuel H. Hartman,  
By atty A. B. Stoughton.

UNITED STATES PATENT OFFICE.

SAMUEL H. HARTMAN, OF PITTSBURG, PENNSYLVANIA.

IMPROVEMENT IN SLIDE-VALVES FOR STEAM-ENGINES.

Specification forming part of Letters Patent No. 36,299, dated August 26, 1862.

*To all whom it may concern:*

Be it known that I, SAMUEL H. HARTMAN, of Pittsburg, in the county of Allegheny and State of Pennsylvania, have invented certain new and useful Improvements in Balance-Valves of Steam-Engines; and I do hereby declare the following to be a full, clear, and exact description of the same, reference being had to the accompanying drawings, making a part of this specification, in which—

Figure 1:
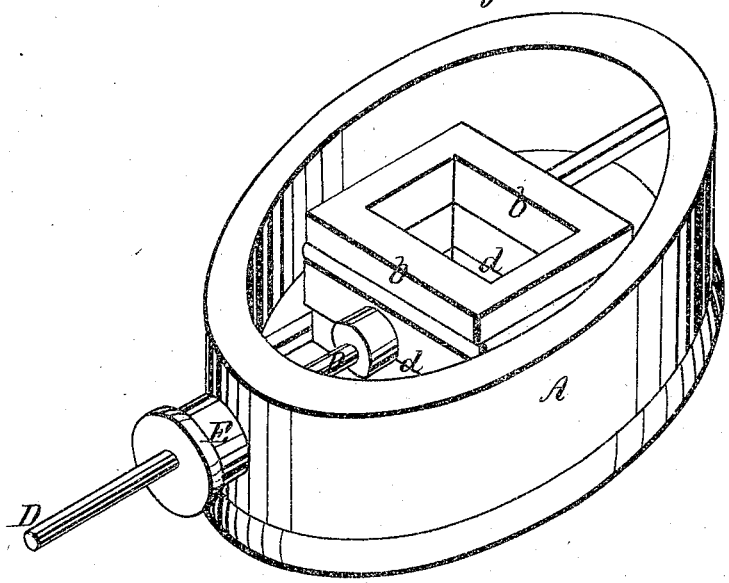
Figure 2:
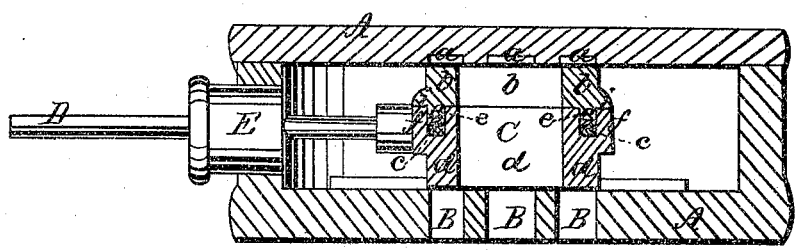

Figure 1 represents a perspective view of a steam-chest with the top removed to show the interior thereof. Fig. 2 represents a vertical central section thereof in the line of the motion of the valve-rod.

My invention consists in making the valve open through the center and in not less than two parts, with rubber or its equivalent packing between said parts for the purpose of causing both sides of the valve to work close to the top and bottom or opposite sides of the steam-chest.

To enable others skilled in the art to make and use my invention, I will proceed to describe the same with reference to the drawings.

A represents a steam-chest, which may be round, square, or oblong, and B B B represent the steam-ports therein. Directly opposite these ports B, on the opposite side of the chest, there are recesses a a a, of the same width and length of the ports, so that the instant steam is let in or shut off at one of the ports it will at the same instant operate by equal pressure on the top and bottom of the valve by finding its way into the recess immediately opposite that port, and thus the pressure is equal on both sides of the valve.

In order that the valve C may work in close contact with the top and bottom or sides of the steam-chest without undue friction, I construct as follows: The valve is made in two parts, b d, the one, d, having a groove all around it, in which rubber or its equivalent packing c is placed. The other part, b, has a tongue, e, upon it, which fits into the groove of the first-named part and rests upon the rubber packing c, so that the rubber shall press the two parts of the valve against their respective sides of the chest, but at the same time yield when any undue pressure should come upon one or both sides of the valve.

D is the valve-rod. It is packed in the usual well-known manner at E, where it enters or works through the chest.

It will be perceived that the moment the valve exposes the least opening at one of the ports an opening of similar superficial area is opened at its other side, and thus the pressure upon both sides of the valve is uniform. Instead of making the valve of two pieces it is obvious that the lid of the valve may be made in two pieces, with the rubber packing between said pieces, and then the valve may be made in one piece; but I prefer the valve in two pieces and the lid in one piece, as represented, deeming the change but an obvious modification of the invention as set forth.

When a groove is used for the rubber packing, it should be larger than the packing, so that the rubber could expand or contract, or instead of the groove an open recess may be used, or the lip f may be partially removed and the rubber placed between it and the shoulder i.

Having thus described my invention, what I claim is—

In combination with a valve open through the center, or with a lid made in two pieces, a groove or recess in one piece containing rubber packing and a tongue or shoulder in or on the other piece to bear against said rubber packing, for the purpose of making the sides of the valve work steam-tight or nearly so on opposite sides of the chest, as set forth.

S. H. HARTMAN.

Witnesses:
A. B. STOUGHTON,
H. W. PRICE.